Patented June 6, 1939

2,160,945

UNITED STATES PATENT OFFICE 2,160,945

CO-POLYMERS OF VINYLIDENE CHLORIDE

Ralph M. Wiley, Midland, Mich., assignor to The Dow Chemical Company, Midland, Mich., a corporation of Michigan No Drawing. Application July 2, 1938, Serial No. 217,219

12 Claims. (Cl. 260—80)

This invention relates to products prepared by the co-polymerization of vinylidene chloride with an acrylate. The term "acrylate" herein employed is intended to designate a compound selected from the group consisting of the lower alkyl esters of acrylic acid and its homologs having the general formula

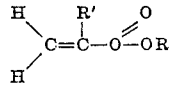

wherein R is a lower alkyl radical and R' is hydrogen or an alkyl radical containing from 1 to 3 carbon atoms, inclusive.

It is among the objects of this invention to prepare resins from vinylidene chloride which are thermoplastic and more soluble in organic solvents than are most resins heretofore produced from this material. Another object of the invention is to provide a process whereby resins, a major component of which is vinylidene chloride, may be prepared in such a manner as to yield products having predetermined physical properties. A further object of the invention is to provide a co-polymer of vinylidene chloride with an acrylate.

I have discovered that the co-polymerization of vinylidene chloride and esters of acrylic acid or of methacrylic acid, suitably in the presence of a catalyst for the polymerization of olefinic compounds, results in the formation of valuable resin-like masses. In carrying out my invention, the desired proportions of vinylidene chloride and an acrylate are mixed together, a catalyst added thereto, and the reaction carried out by maintaining the aforesaid mixture at suitable temperatures until the desired degree of co-polymerization has been obtained. Any remaining substantially monomeric material may then be recovered from the polymerized product, suitably by distillation, leaving the crude co-polymer as a residue. The crude co-polymerized mixture may, if desired, be purified by washing, bleaching, or other suitable operations and is then capable of being molded, rolled, extruded, or otherwise fabricated.

My new resins may be obtained in a variety of physical forms, e. g., as a powder, porous solid, rubbery mass, or hard, bone-like material, depending upon the degree of completeness to which the reaction process is carried and upon the proportion of acrylate employed. Regardless of the physical form in which they are obtained, I have found that my new products possess relatively low softening points and exhibit desirable plasticity at their molding temperatures.

I have prepared resinous compositions of the present type from mixtures of vinylidene chloride and methyl acrylate, ethyl acrylate, or methyl methacrylate containing up to 30 per cent of the acrylate, and have obtained as final product co-polymers containing up to 45 per cent by weight of polymerized acrylates therein. While I prefer to incorporate an amount of acrylate in the final resinous product equivalent to between about 1 per cent and about 50 per cent of the weight of the co-polymers, co-polymers of an acrylate and vinylidene chloride in all proportions are included in the scope of my invention.

In a preferred method of operation, vinylidene chloride has been mixed with an acrylate in ratios from about 1 to 30 parts by weight of the latter to about 70 to 99 parts by weight of the former together with small amounts, ordinarily not in excess of about 3 per cent by weight, of a suitable catalyst such as benzoyl peroxide or the mixtures described in the following examples. This mixture is submitted to co-polymerization in a closed vessel at temperatures suitably in the range between 15° and 65° C., and preferably between 25° and 45° C., although higher temperatures than those mentioned here may be employed without too deleterious an effect upon the final product. The reaction mixture is maintained at the desired temperature, and usually at a pressure not less than atmospheric pressure nor greater than the vapor pressure of reactants at such temperature, until the desired degree of reaction is obtained. The time required for reaction is dependent upon the proportion of reactants, the catalysts employed, the temperature of reaction, and the degree of polymerization desired, but under preferred conditions of operation does not ordinarily exceed 200 hours. Unpolymerized material is thereafter separated from the reacted mixture, e. g., by warming the same, possibly at reduced pressure, to approximately 170° C., or by fractional solvent extraction, etc., and may be utilized in further runs. The co-polymers are recovered as a residue from the above separation step, and if desired may be purified, as by washing with a dilute aqueous or organic solvent solution of chlorine, nitric acid, etc., although this is not necessary. Such a step, if carried out, serves not only as a bleach but also removes to a large extent residual catalyst bodies present in the co-polymer, and in so doing increases the resistance of the co-polymer to thermal decomposition. After such an acid wash the product is re-washed with hot water or alcohol to remove acid residues therefrom, and after drying is ready for fabrication.

The physical form of the co-polymer obtained is dependent upon the proportions of vinylidene chloride and acrylate, and upon the degree of completeness to which the reaction is carried. Thus, when 5 per cent of an acrylate is mixed with 95 per cent vinylidene chloride and the heating step of the process described above is stopped when only about 20 per cent of the reactants have been polymerized, the product is obtained as a white powder. If polymerization is interrupted when from 40 to 50 per cent of the mass has reacted, the resin is isolated as a highly porous mass. A hard bone-like product is obtained when the polymerization is carried out substantially to completion. Products having the highly porous or bone-like structures may, if desired, be broken up or pulverized before molding.

The following examples illustrate certain ways in which the principle of my invention has been applied, but are not to be construed as limiting the invention:

*Example 1*

To 30 grams of a mixture composed of 30 per cent by volume of methyl methacrylate and 70 per cent vinylidene chloride was added about 2 per cent by weight of a catalyst mixture comprising benzoyl peroxide, chloracetyl chloride, nickel carbonyl, and lead tetraethyl. This mixture was polymerized at 30° C. for 1 day and thereafter subjected to a temperature of 50° C. for 3 days, and finally to a temperature of 30° C. for 19 days, in a clear glass bottle. The product was soft and rubbery before being dried, but became hard and tough upon drying. The dried material weighed 18.7 grams and analysis showed it to contain 42.6 per cent chlorine, which corresponds to a co-polymerized vinylidene chloride content of about 58 per cent. The co-polymerized material is insoluble in hot carbon tetrachloride, is unaffected by cold carbon tetrachloride, and only slightly affected by acetone. It dissolves with relative ease, however, in 1.4-dioxan. It is thermoplastic and capable of being molded, rolled, or extruded as desired.

*Example 2*

To 30 grams of a mixture composed of 30 per cent by volume of methyl acrylate and 70 per cent vinylidene chloride was added an amount of the catalyst mixture described in the foregoing example equivalent to 2 per cent of the weight of the other reagents. The polymerization procedure was identical with that described above and the product underwent the same physical changes, being converted on drying from a soft rubbery product to a hard, tough material. Analysis showed it to contain 45.1 per cent chlorine corresponding to a co-polymerized vinylidene chloride content of about 62 per cent. The weight of this product was 15.2 grams.

*Example 3*

In the same manner as has just been described a mixture of ethyl acrylate and vinylidene chloride, in proportions corresponding to those used in the experiments on methyl acrylate and methyl methacrylate, was subjected to co-polymerization. The dried product contained 51.7 per cent chlorine which corresponds to about 71 per cent co-polymerized vinylidene chloride in the co-polymer.

The methyl methacrylate product was slightly yellow in color while the co-polymers formed from ethyl and methyl acrylate had a light greenish tinge due to the presence of catalysts which, in these experiments, were not removed. The methyl and ethyl acrylate-vinylidene chloride co-polymers were not as resistant to the action of organic solvents as was the material resulting from the co-polymerization of vinylidene chloride with methyl methacrylate. The esters of acrylic acid yielded co-polymers having a higher degree of thermoplasticity than did the methacrylate esters.

*Example 4*

A series of co-polymers of vinylidene chloride and ethyl acrylate were prepared by mixing the amount of the respective monomeric materials indicated in the following table with ½ per cent by weight of benzoyl peroxide as catalyst. The monomeric mixture was heated at about 45° C. for 67 hours in closed glass bottles immersed in a thermostatically controlled water bath. At the end of this period the polymeric product was washed with acetone to remove remaining monomer, dried at 50° C., and portions thereof were subjected to chemical analysis while the remainder was used for softening point determinations and molding characteristics.

| Monomeric mixture | | Ethyl acrylate in co-polymer | Softening point |
|---|---|---|---|
| Vinylidene chloride | Ethyl acrylate | | |
| *Percent* | *Percent* | *Percent* | *°C.* |
| 100 | 0 | 0 | 188.5 |
| 99 | 1 | 0.41 | 180 |
| 98 | 2 | 1.1 | 173 |
| 97 | 3 | 2.2 | 170 |
| 96 | 4 | 4.4 | 166 |
| 95 | 5 | 4.0 | 168 |

From the foregoing table it is observed that when a co-polymer of vinylidene chloride and ethyl acrylate contains 1 per cent or more of ethyl acrylate co-polymerized with the vinylidene chloride, the softening point of the co-polymer is at least 15 degrees below that of polymeric vinylidene chloride alone. This 15 degree differential makes a co-polymer containing 1 per cent or more of an acrylate much more useful than polymeric vinylidene chloride alone since the co-polymer can be molded or otherwise plastically deformed at lower temperatures and under otherwise similar conditions with less danger of thermal decomposition during the molding operation.

*Example 5*

A mixture of 3 per cent monomeric methyl methacrylate, 3 per cent ethyl acrylate, 93.5 per cent vinylidene chloride, and 0.5 per cent benzoyl peroxide was stirred in a nickel autoclave at 45° C. until about 40 per cent of the mixture had co-polymerized. The polymeric product was washed with acetone and dried at 50° C. This co-polymer had a softening point of about 160° C. and when molded at temperatures slightly above its softening point gave tough, moderately pliable articles.

*Example 6*

In a manner analogous to that set forth in the preceding example, a mixture of 5 per cent monomeric methyl methacrylate, 5 per cent ethyl acrylate, 89.5 per cent vinylidene chloride, and 0.5 per cent benzoyl peroxide was polymerized at 45° C. The co-polymer was freed from remaining monomeric material and was found to have a softening point of 110° C. This co-polymer was tough, elastic, and somewhat rubbery after being molded at 120° C. The co-polymer was substantially colorless, and when prepared in the form of thin sheets, was transparent.

As shown by the two preceding examples, co-polymers of vinylidene chloride and more than one acrylate of the herein-defined type may be prepared and are useful for the same general purposes as are the binary co-polymers of vinylidene chloride and a single acrylate. In the appended claims it is to be understood that co-polymers of vinylidene chloride and more than one acrylate are contemplated as well as are the binary co-polymers of vinylidene chloride and a single acrylate.

The thermoplasticity of the co-polymeric materials is greater in every instance than that of vinylidene chloride resins alone and is also greater than that of mixed resins produced by intimately grinding together polymerized vinylidene chloride and polymerized acrylates in the same ratios in which these materials exist in my co-polymers.

Although, as stated above, the co-polymeric substances herein described are partially dissolved by many common organic solvents, it has been discovered that reasonably concentrated solutions, i. e. up to 70 per cent, depending upon the nature of the particular co-polymeric composition concerned, can be produced by warming the materials, suitably in finely divided form, with diethylene oxide (1.4-dioxan). Such solutions are especially useful in the preparation of films, filaments, or lacquers from my co-polymeric products.

While the above examples illustrate the preparation of co-polymers of vinylidene chloride and the methyl and ethyl esters of acrylic and methacrylic acids, other acrylate compounds, for example, propyl, butyl, or amyl acrylate; ethyl, isopropyl, or butyl methacrylate; or the corresponding esters of other alkyl-substituted acrylic acids having the general formula given above may be substituted for the acrylate used in the examples to produce equally valuable products. Although I have pointed out above that the herein-described co-polymerization procedure is ordinarily carried out at atmospheric pressure or at the vapor pressure of the materials at the reaction temperature, greater pressures may on occasions be advantageously applied. In such cases the reaction may be carried out, for example, in an inert atmosphere of nitrogen or other suitable gas, introduced into the reaction zone under increased pressures either prior to or during the heating process.

I have further discovered that the new co-polymers may be converted by application of pressure, and at temperatures between 80° and 170° C., the actual temperature employed depending upon the softening point of the particular co-polymer and ordinarily being at or slightly above that softening point, into translucent or nearly transparent resinous bodies. By incorporating a plasticizing agent in the co-polymer prior to molding, the preparation of the resinous bodies may be carried out at even lower temperatures. Suitable plasticizers are chlorinated diphenyloxide, butyl phthalate, chloronaphthalene, tricresyl phosphate, pentachloroethane, or hexachloroethane.

Such resinous bodies are normally obtained in substantially colorless form, but may be dyed to any desired color or shade by incorporating pigments or dyes therewith. While the above resinous bodies have a high tensile strength immediately after preparation, it has been determined that the act of drawing, pressing, or otherwise stretching the same increases the tensile strength and toughness and further decreases their susceptibility to solvent action. In addition to the characteristics just mentioned, I have observed that these compositions are especially resistant to chemical attack by acids, bases, and oxidizing agents.

If desired, heat stabilizing agents such as methyl stearate, dichloro-methyl stearate, calcium stearate, etc., may be incorporated in the co-polymeric product, either by including such material in the original reaction mixture prior to the polymerization or by adding the same to the pre-formed co-polymer. The addition of such materials greatly increases the resistance of the final product to thermal decomposition and to discoloration caused thereby.

Molded resins may be prepared from any of the above forms, and the molding process conveniently carried out at approximately the softening temperature of the resin concerned, generally between 80° and 170° C. The molding temperature chosen is preferably below the decomposition temperature of the particular resin concerned, the latter temperature being largely dependent upon the proportion of acrylate present in the original reaction mixture, the amount of residual catalyst dispersed in the resin product, and the presence or absence of heat-stabilizing agents. In the molding operation the co-polymer, preferably in finely divided form, is heated in a die of usual type to the molding temperature, i. e. the softening temperature of the resin as specified above, after which a pressure between about 100 and 2000 pounds per square inch is applied momentarily, the die cooled, and the molded resin product promptly removed.

Filaments may be produced by extruding the co-polymerized material through small orifices in a plate at the softening temperature of the resin and preferably between 110° and 150° C., into a cooling medium and applying tension to the cooled extruded material so as to draw the same into the desired filaments. The step of extruding and drawing is essentially a stretching operation, and results in a filament of maximum toughness and high tensile strength. Filaments may be produced by extruding solutions of the vinylidene chloride-acrylate co-polymer into a drying or coagulating medium. Such medium is ordinarily one which is miscible with the solvent employed but which is in itself not a solvent for the co-polymer, or it may be a medium which by virtue of its temperature causes volatilization of the solvent.

In preparing molded articles from my new co-polymers, various fillers such as wood flour, asbestos fibers, cellulose fibers, or any finely divided inert material, may be added by mixing the finely divided inert material with the powdered co-polymer in the die, by rolling the filler with the co-polymer on masticating rolls, or, if desired, by incorporating the filler with the reaction mixture prior to the co-polymerization reaction.

My new co-polymers and the resinous bodies prepared therefrom have, among others, the following advantages: (1) they are more soluble in organic solvents than are resins produced from vinylidene chloride alone; (2) they are substantially unaffected by most acids, bases, and oxidizing agents, and may be useful as coating materials for the interior of chemical reactors; (3) they have in their stretched, e. g., drawn and extruded form, a high tensile strength and are very tough and resistant to fracture; (4) they have low molding and softening temperatures and are more stable than polymeric vinylidene chloride alone at the respective molding temperatures; (5) they are internally plasticized due to their co-polymeric structure and they exhibit a desirable degree of plasticity at their molding temperatures; (6) they are compatible with many common and some new plasticizing and heat stabilizing agents; (7) they may be molded, drawn, rolled, or extruded at relatively low pressure to form valuable plastic articles, filaments, threads, sheets, etc. which retain the characteristics of high tensile strength and toughness shown by the parent product; and (8) they may be obtained in a variety of useful forms. The disclosed process economically produces the above described improved products under moderate conditions of temperature and pressure.

This application is a continuation-in-part of my co-pending application Serial Number 123,480, filed February 1, 1937.

Other modes of applying the principle of my invention may be employed instead of those explained, change being made as regards the materials employed, provided the step or steps or the product recited in the following claims be thereby carried out or obtained.

I therefore particularly point out and distinctly claim as my invention:

1. The method which comprises reacting vinylidene chloride with an acrylate selected from the group consisting of the lower alkyl esters of acrylic acid and its homologs, having the general formula

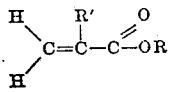

wherein R is a lower alkyl group and R' is a member of the class consisting of hydrogen and alkyl radicals containing from 1 to 3 carbon atoms, inclusive, to produce co-polymeric bodies containing between about 1 and about 50 per cent by weight of the said acrylate co-polymerized with the vinylidene chloride.

2. In a process for preparing a plastic body, the step of warming a vinylidene chloride solution containing between about 1 and about 30 parts by weight of an acrylate selected from the group consisting of the lower alkyl esters of acrylic acid and its homologs, having the general formula

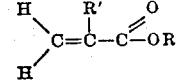

wherein R is a lower alkyl group and R' is a member of the class consisting of hydrogen and alkyl radicals containing from 1 to 3 carbon atoms, inclusive, and between about 70 and about 99 parts by weight of vinylidene chloride to a temperature between about 15° and about 65° C. in the presence of polymerization catalysts to produce polymeric bodies containing between about 1 and about 50 per cent by weight of said acrylate co-polymerized with the vinylidene chloride.

3. In a process for preparing a plastic, the step which consists in reacting vinylidene chloride with methyl acrylate to produce polymeric bodies containing between about 1 and about 50 per cent by weight of the methyl acrylate co-polymerized with the vinylidene chloride.

4. In a process for preparing a plastic, the step which consists in reacting vinylidene chloride with ethyl acrylate to produce polymeric bodies containing between about 1 and about 50 per cent by weight of the ethyl acrylate co-polymerized with the vinylidene chloride.

5. In a process for preparing a plastic, the step which consists in reacting vinylidene chloride with methyl methacrylate to produce polymeric bodies containing between about 1 and about 50 per cent by weight of the methyl methacrylate co-polymerized with the vinylidene chloride.

6. In a process for preparing a plastic body, the step which consists in warming a vinylidene chloride solution containing between about 1 and about 30 parts by weight of methyl acrylate and between about 70 and about 99 parts by weight of vinylidene chloride to a temperature between about 15° and 65° C., and in the presence of polymerization catalysts to produce polymeric bodies containing between about 1 and about 50 per cent by weight of the methyl acrylate co-polymerized with the vinylidene chloride.

7. In a process for preparing a plastic body, the step which consists in warming a vinylidene chloride solution containing between about 1 and about 30 parts by weight of ethyl acrylate and between about 70 and about 99 parts by weight of vinylidene chloride to a temperature between about 15° and 65° C., and in the presence of polymerization catalysts to produce polymeric bodies containing between about 1 and about 50 per cent by weight of the ethyl acrylate co-polymerized with the vinylidene chloride.

8. In a process for preparing a plastic body, the step which consists in warming a vinylidene chloride solution containing between about 1 and about 30 parts by weight of methyl methacrylate and between about 70 and about 99 parts by weight of vinylidene chloride to a temperature between about 15° and 65° C., and in the presence of polymerization catalysts to produce polymeric bodies containing between about 1 and about 50 per cent by weight of the methyl methacrylate co-polymerized with the vinylidene chloride.

9. A co-polymer of vinylidene chloride and between about 1 and about 50 per cent by weight of an acrylate selected from the group consisting of the lower alkyl esters of acrylic acid and its homologs having the general formula

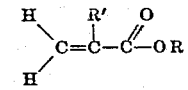

wherein R is a lower alkyl group and R' is a member of the class consisting of hydrogen and alkyl radicals containing from 1 to 3 carbon atoms, inclusive.

10. A co-polymer of vinylidene chloride with methyl acrylate wherein the methyl acrylate constitutes between about 1 and about 50 per cent by weight of the co-polymer.

11. A co-polymer of vinylidene chloride with ethyl acrylate wherein the ethyl acrylate constitutes between about 1 and about 50 per cent by weight of the co-polymer.

12. A co-polymer of vinylidene chloride with methyl methacrylate wherein the methyl methacrylate constitutes between about 1 and about 50 per cent by weight of the co-polymer.

RALPH M. WILEY.